United States Patent [19]

Nakatsuka

[11] Patent Number: 4,934,737
[45] Date of Patent: Jun. 19, 1990

[54] POWER TILTABLE STEERING WHEEL

[75] Inventor: Hiroshi Nakatsuka, Hiroshima, Japan

[73] Assignee: Mazda Motor Corporation, Hiroshima, Japan

[21] Appl. No.: 263,443

[22] Filed: Oct. 27, 1988

[30] Foreign Application Priority Data

Oct. 27, 1987 [JP] Japan ................................ 62-271259

[51] Int. Cl.⁵ ............................................... B62D 1/18
[52] U.S. Cl. ...................................... 280/775; 180/78; 74/493; 364/424.01
[58] Field of Search ........................... 200/775; 180/78; 74/493, 492; 318/466; 364/425, 424.01

[56] References Cited

U.S. PATENT DOCUMENTS 3,216,521  11/1965  Ulrich ..................................... 180/78
4,503,504  3/1985   Suzumura et al. ................... 280/775
4,750,379  6/1988   Nishikawa et al. .................. 280/775
4,752,085  6/1988   Yamamoto ........................... 280/775

FOREIGN PATENT DOCUMENTS 60-157962  8/1985  Japan .

Primary Examiner—Kenneth R. Rice
Attorney, Agent, or Firm—Fleit, Jacobson, Cohn, Price, Holman & Stern

[57] ABSTRACT

A power tiltable steering wheel has a steering column tube for supporting a steering wheel and a steering shaft. A power tiltable steering mechanism tilts the steering column tube. A control unit controls the power tiltable steering mechanism. When the driver gets out of the vehicle, the steering wheel is automatically tilted to a highest position. When the driver gets in the vehicle, the driver can adjust the position of the steering within a tiltable angle range that is lower than the noted highest position.

5 Claims, 3 Drawing Sheets

POWER TILTABLE STEERING WHEEL

FIELD OF THE INVENTION

The present invention relates to a tiltable steering column or wheel that can be moved vertically by a power means.

BACKGROUND OF THE INVENTION

Conventionally, it is known for a vehicle to have a tiltable steering wheel. It has been proposed for the purpose of improving comfort of driver's entrance or departure from the vehicle, to provide a steering column or steering wheel that automatically moves to a position remote from the driver when a device senses that the driver is about to alight from the vehicle and that automatically returns the steering column or wheel to a selected position when the driver re-enters the vehicle and is seated. For example, the Japanese unexamined patent publication No. 60-157962 and the U.S. Pat. No. 3,216,521 disclose such an arrangement for a tiltable steering wheel. Further, in the tiltable steering wheel disclosed in the U.S. Pat. No. 3,216,521, a control means for selecting the position of the steering wheel or steering column to suit the particular characteristics of the driver is provided.

It should be noted that a large tiltable angle of the steering wheel is desired for improving the comfort of a driver's entrance or departure from the vehicle. But, a large tiltable angle is not desired for selecting the position of the steering wheel by the control means. If the driver selects too high a position of the steering wheel by the control means, a safety problem may arise.

SUMMARY OF THE INVENTION

It is, therefore, the principal object of the present invention to provide a steering wheel upon which limits are set to the tiltable angle of the steering wheel by the control means. It is another object of the present invention to prevent the driver from selecting too high a position of the steering wheel by manipulating a finger tip control.

According to the present invention, the above and other objects are accomplished by utilization of a power tiltable steering wheel in accordance with the teachings of the present invention. In addition to the powerized selectability and the automatic movement, the novel power tiltable steering wheel is so designed that the tiltable angle range of the steering wheel by the control means is smaller than the tiltable angle of the steering wheel for driver's entrance or departure from the vehicle.

According to the features of the present invention, the driver cannot select too high a position of the steering wheel by manipulating a finger tip control. Therefore, safety is greatly improved.

BRIEF DESCRIPTION OF THE DRAWINGS

The above and other objects and features of the present invention will become apparent from the following description of a preferred embodiment making reference to the accompanying drawings in which.

DESCRIPTION OF THE PREFERRED EMBODIMENT

Figure 1:
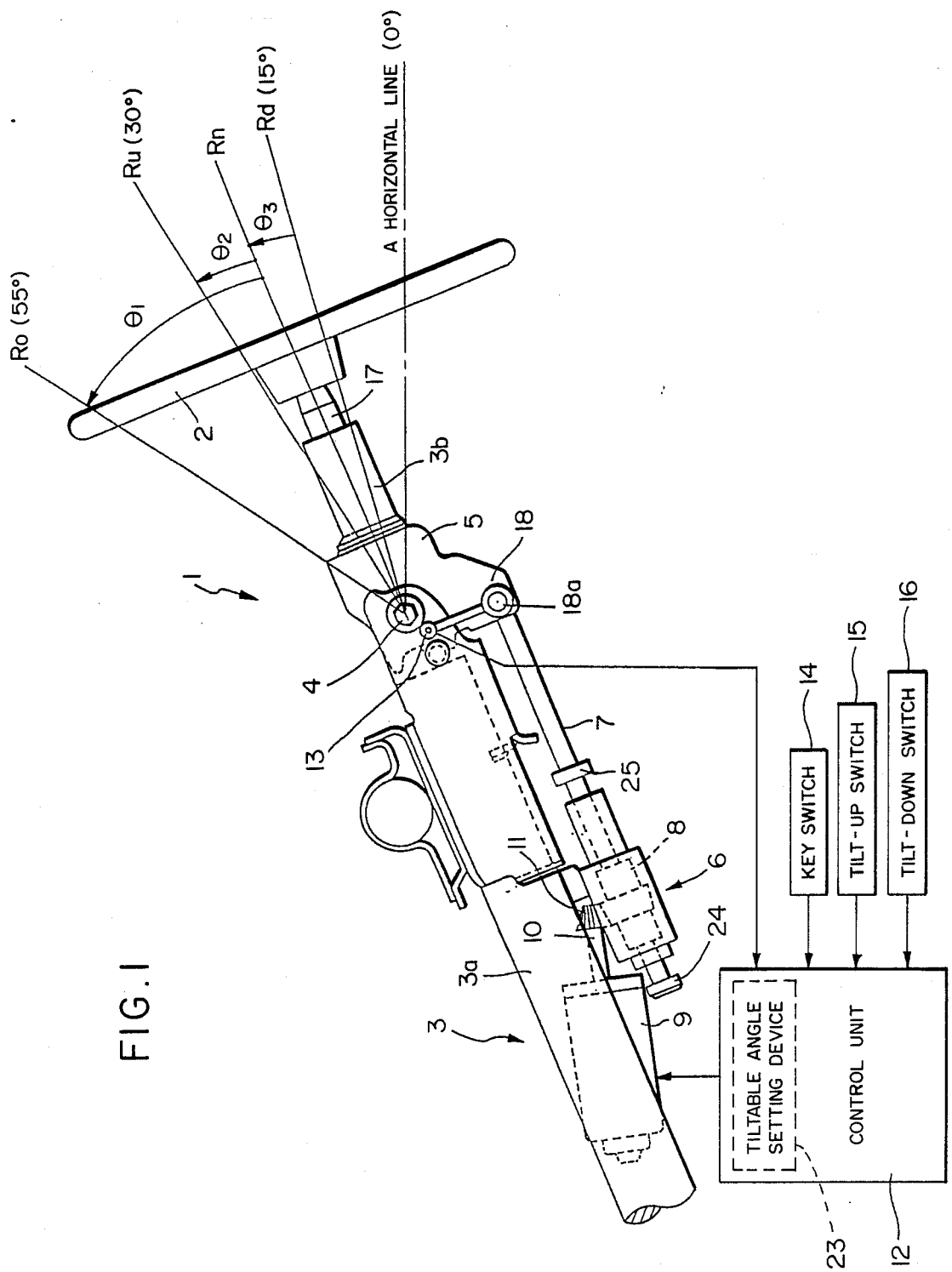
FIG. 1 is a side view schematically showing a power tiltable steering wheel in accordance with an embodiment of the present invention.

Referring now to the drawings, and in particular to FIG. 1, the preferred embodiment of the steering structure 1 of the invention consists of a steering wheel 2 rigidly attached to a steering shaft 17 rotatably mounted in a steering column tube 3. The steering column tube 3 has an upper column tube 3b and a lower column tube 3a that is rigidly attached to the vehicle body. The upper column tube 3b is carried by a support bracket 5 that is pivotally connected with the upper end of the lower column tube 3a by a pair of pins (one of which is shown at 4). The steering shaft 17 is also divided into an upper element and a lower element so as to tilt. An arm portion 18 downwardly projects from the main body of support bracket 5. A worm gear mechanism 6 has a worm gear shaft 7. The upper end of the worm gear shaft 7 is pivotally connected with the arm portion (18 by pivot pin 18a).

Figure 2:
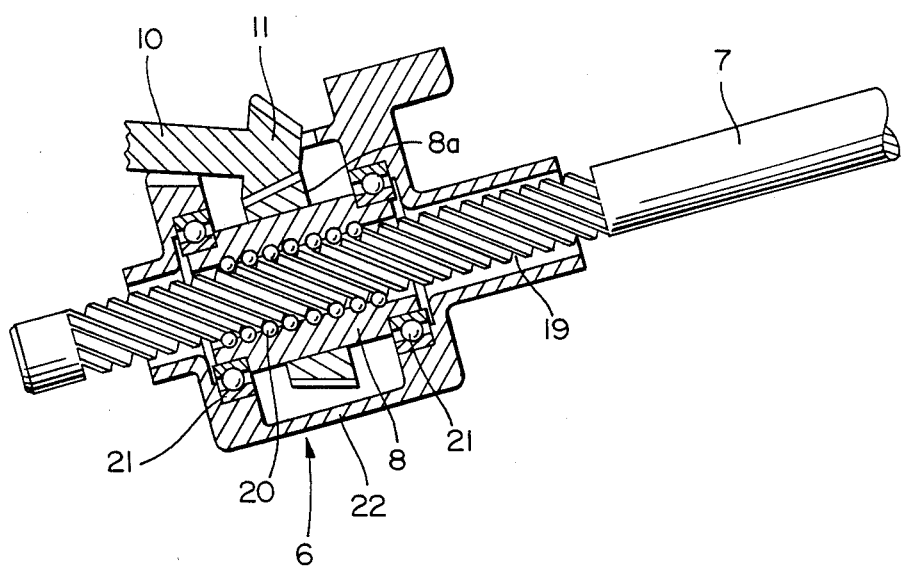
FIG. 2 is an enlarged sectional view showing a worm gear mechanism used in the present invention.

Referring to FIG. 2, the worm gear mechanism 6 consists of a ball-nut 8 rotatably mounted in housing 22 by bearings 21, a worm gear 19 formed on the outer surface of the worm gear shaft 7, and several balls 20 which are situated between the ball-nut 8 and the worm gear 19. A bevel gear 11 is connected on the end of output shaft 10 driven by an electric motor 9, and engaged to a bevel gear 8a integral with the ball-nut 8. The worm gear shaft 7 has a tilt-up stopper 24 and a tilt-down stopper 25 for failsafe fixed thereto. The rotation of the output shaft 10 by motor 9 is transmitted to the ball-nut 8 via bevel gears 11 and 8a. The rotation of the ball-nut 8 is transmitted to the worm gear shaft 7 producing axial movement thereof. The axial movement of the worm gear shaft 7 tilts the upper column tube 3b about pivot 4.

As shown in FIG. 1, the motor 9 is controlled by a signal from a control unit 12 including a micro computer or processor. The control unit 12 detects signals from a tilting angle sensor 13, a key switch 14, a tilt-up switch 15, and a tilt-down switch 16. The control unit 12 includes a tiltable angle setting device 23 for setting the tiltable angle of the steering wheel by controlling or preselecting the effect of the tilt-up and tilt-down switches 15, 16 being smaller than the tiltable angle of the steering wheel for driver's entrance or departure from the vehicle as detected by the key switch 14.

Figure 3:
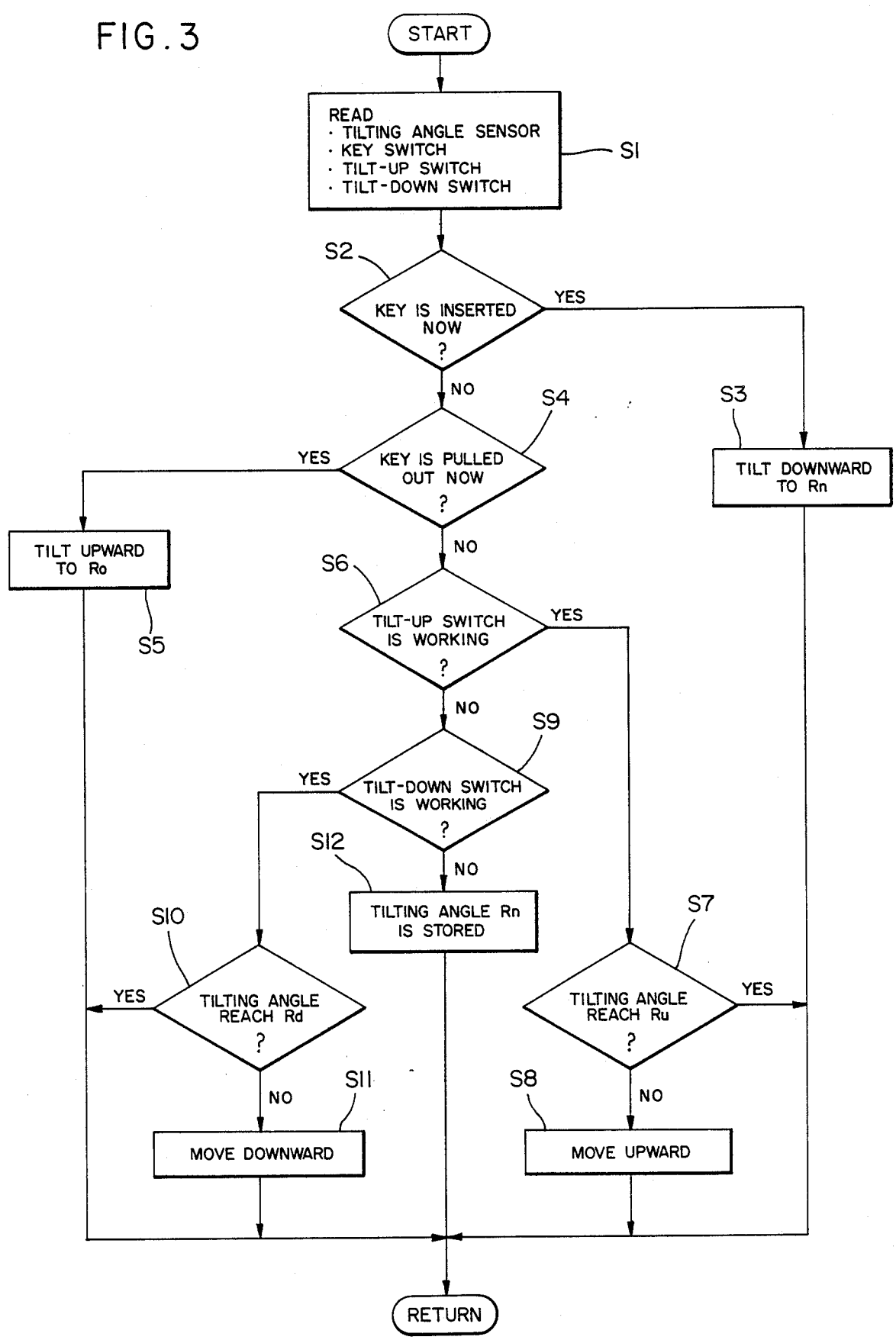
FIG. 3 is a flow chart showing the operation of the control unit.

Control by the control unit 12 will be described in detail with reference to the flow chart as shown in FIG. 3. In the following description, the reference symbol "S" means step. The signals of the tilting angle sensor 13, the key switch 14, the tilt-up switch 15 and the tilt-down switch 16 are read in S1. A determination is made whether the key is inserted now or not in S2. If the key is inserted now, the steering wheel 2 is tilted downward to a memorized position $R_n$ from a high position $R_o$ for driver's entrance or departure from the vehicle in S3. If the key was set already, a determination is made whether the key is pulled out now or not in S4. If the key is pulled out now, the steering wheel 2 is titled upward to the high position $R_o$ in S5. If the key is not pulled out now and is already inserted, a determination is made whether the tilt-up switch is working or not in S6. If the tilt-up switch is working, a determination is made whether the tilting angle of the steering wheel 2 reaches a predetermined angle $R_u$ for limiting to tilt upward or not in S7. Although the tilt-up switch is working, if the tilting angle of the steering wheel 2 searches the predetermined angle $R_u$, the motor 9 is not worked. If the tilting angle of the steering wheel 2 doesn't reach the predetermined angle $R_u$, the motor 9 is worked and the steering wheel 2 is moved upward in S8. If the tilt-up switch is not working in S6, a determination is made whether the tilt-down switch is working or not in S9. If the tilt-down switch is working, a determination is made whether the tilting angle of the steering wheel 2 reaches a predetermined angle $R_d$ for limiting to tilt downward or not in S10. Although the tilt-down switch is working, if the tilting angle of the steering wheel 2 reaches the predetermined angle $R_d$, the motor 9 is not worked. If the tilting angle of the steering wheel 2 doesn't reach the predetermined angle $R_d$, the motor 9 is worked and the steering wheel 2 is moved downward in S11. If the tilt-up switch and the tilt-down switch are not working, the tilting angle of the steering wheel 2 is stored in the control unit 12 as the memorized position $R_n$ in S12.

In FIG. 1, $\theta_1$ is a tilted angle from $R_u$ to $R_o$, $\theta_2$ is a tilted angle from $R_n$ to $R_u$, $\theta_3$ is a tilted angle from $R_n$ to $R_d$. The value of $\theta_2+\theta_3$ is determined as:

$$\theta_2+\theta_3<\theta_1+\theta_3$$

In this embodiment, positions $R_o$, $R_u$ and $R_d$ are designed to be 55°, 30° and 15°, respectively, to a horizontal line (0°).

From the above description, it will be understood that according to the present invention, the driver's entrance or departure from the vehicle is made more comfortable because of the high position $R_o$. It will be further understood that according to the present invention, safety is greatly improved, because the driver cannot select a high driving position that is higher than $R_u$.

The invention has thus been shown and described with reference to a specific preferred embodiment; however, it should be noted that the invention is in no way limited to the details of the illustrated and described preferred embodiment but changes and modification may be made by on skilled in the art without departing from the spirit and scope of the appended claims.

What is claimed is:
1. A power tiltable steering wheel comprising
(a) a manually operated steering wheel;
(b) steering shaft means for connecting said steering wheel and for transmitting movement of the steering wheel to a steering gear;
(c) steering column means for supporting rotatably said steering shaft means;
(d) power tiltable steering means for tilting said steering column means;
(e) driver getting in and out detecting means for detecting a driver getting in and out;
(f) position adjustment switch means for adjusting the position of said steering wheel, said position adjustment switch means being manipulated by the driver;
(g) control means for controlling said power tiltable steering means such that said steering wheel is automatically tilted in response to a signal from said driver getting in and out detecting means;
(h) a tilting angle of said steering wheel being adjusted in response to a signal from said position adjustment switch means; and
(i) tiltable angle setting means provided in said control means for limiting the tiltable angle of said steering wheel as set by a signal from said position adjustment switch means within a predetermined angle smaller than the tiltable angle of said steering wheel as set by a signal from said driver getting in and out detecting means to prevent the driver from selecting too large a tilting angle of the steering wheel, even if the driver continues manipulating said position adjustment switch means.

2. A power tiltable steering wheel in accordance with claim 1 in which said tiltable angle setting means sets a highest position by adjusting responsive to said position adjustment switch means lower than a highest position by tilting in response to signals from said driver getting in and out detecting means.

3. A power tiltable steering wheel in accordance with claim 2 in which said power tiltable steering means includes an electric motor.

4. A power tiltable steering wheel in accordance with claim 3 in which said control means controls said power tiltable steering means such that the tilting angle of the steering wheel as adjusted by said position adjustment switch means is stored in the control unit, and said steering wheel is automatically tilted to the memorized position when the driver gets in responsive to a signal of said driver getting in and out detecting means.

5. A power tiltable steering wheel in accordance with claim 4 in which said driver getting in and out detecting means includes a key switch for detecting whether a key is inserted or not, for example, in an ignition switch.

* * * * *